INVENTOR
Lawrence W. Hargett

INVENTOR
Lawrence W. Hargett
BY Polachek & Saulsbury
ATTORNEYS

United States Patent Office 3,435,538
Patented Apr. 1, 1969

3,435,538
WEB DRYING APPARATUS HAVING MULTIPLE HOT AIR NOZZLES AND EXHAUST OUTLETS
Lawrence W. Hargett, Easton, Pa.
(97 Tracey Place, Englewood, N.J. 07631)
Filed Mar. 8, 1967, Ser. No. 621,498
Int. Cl. F26b *13/08*
U.S. Cl. 34—114
9 Claims

ABSTRACT OF THE DISCLOSURE

The technical disclosure describes apparatus for improving the drying of wet webs by passing hot dry air through multiple nozzles to a web carried on rotating heated dry cylinders. A multiplicity of perforated exhaust outlet tubes are disposed between the cylinders. The nozzles may be made as modular slidable units to facilitate cleaning the cylinders and threading the web around the cylinders.

---

The invention relates to the art of web drying apparatus and more particularly concerns apparatus for drying wet webs by forced convection as the web moves around rotating heated drums or cylinders.

The invention is an improvement over web drying apparatus of the prior art such as that described in U.S. Patent 2,616,188. It is current practice to dry a wet web of cloth, paper, plastic or other sheet material by passing it around internally heated rotating drums. The drums are perforated to allow hot air to pass to the web. This arrangement is not wholly satisfactory for a number of reasons. The rotated internally heated drums are quite complex in construction and very expensive. Also, the drying of the web is not uniform because areas of the web in contact with imperforate parts of the drums are not reached by the heated air passing out of the holes in the drums. Furthermore, only one side of the web is exposed to the drums.

The use of heated, imperforate dry cans, cylinders or drums as rotating rollers has been proposed, but these too do not dry the web efficiently. Moisture laden air lies stagnant in a boundary layer around the heated cans or drums, thereby impeding water vaporization and slowing up drying time; furthermore ambient air streams, without forced air convection, carrying moisture and fumes removed from parts of the web circulate around other parts of the web already partially or fully dried, and contaminate them.

The present invention is directed at apparatus which overcomes the above mentioned difficulties and disadvantages in addition to providing a number of improvements. According to the invention two sets of horizontal nozzles are provided as hot air outlets. The nozzles are disposed adjacent to a stack of rotating heated dry cylinders or cans. The web to be dried is entrained on the cylinders and passes around the cylinders at uniform speed. Two stacks of horizontal exhaust tubes are disposed axially parallel to and between the heated cylinders on opposite sides of the web. The tubes are perforated so that hot air passing from the elongated horizontal nozzles moves over the web and goes directly to the exhaust tubes without recirculating. Thus drying is effected quickly, efficiently and without contamminating the dried portions of the web. The nozzles may be made up as slidable modular units. Each nozzle is connected to the one next to it by a duct which slides into the nozzle body thereby enabling the entire nozzle assembly to collapse to half its height. This can be done at each side of the stack of cylinders or cans. The collapsed section rides up and down the height of the can stack on rails. This facilitates and provides working space for cleaning the cans and for lacing the web around the cans.

The air exhaust tubes are provided with flexible hose connections to their exhaust manifold so that the exhaust manifolds can be positioned according to a particular design of supporting structure for the stack of cans. Thus regardless of any specific can supporting arrangement, the flexible hoses and separate connectors permit proper positioning of the exhaust manifolds for most efficient operation of the web drying system.

It is therefore a primary object of the invention to provide an improved web drying apparatus.

A further object is to provide a web drying apparatus with means for supplying heated, filtered air to each integral part of the web and immediately to remove or exhaust the contaminated, moisture laden air close to the location of generation or source of contamination without permitting recirculation of the contaminated air.

Another object is to provide an air supply and exhaust system for each individual heated drying cylinder confined within as limited a space as practical and as operational limits will permit.

Another object is to provide an air supply and exhaust apparatus for drying a web, the apparatus being arranged to permit access at all sides of the appaartus for cleaning and for threading the web on the cylinders of the apparatus.

Another object is to provide a web drying apparatus which is modular in construction so that more or less air supply nozzles and air exhaust outlet tubes can be supplied at will, according to the arrangement of the associated stack of rotated, heated cans or cylinders.

A further object is to provide a web drying appaartus with collapsible modular nozzle units.

Another object is to provide perforated exhaust tubes with flexible hose connections in a web drying apparatus.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure.

Referring first to FIGS. 1–6, there is shown web drying apparatus 10 including a dual vertical array of axially horizontal cylinders, drums or cans 12a, 12b and 14a, 14b, 14c. Each cylinder has two end heads 16 in which are set axial shafts 20 journaled on supports (not shown). One or more of the cylinders may be directly driven from a single source of motive power (not shown) or they may be idler rollers. In any case, cylinder 12a is axially parallel with cylinder 12b in the same vertical plane. The two cylinders are spaced slightly apart one above the other leaving space S1. Cylinders 14a, 14b, and 14c are disposed in a horizontal plane located midway between cylinders 14a, 14b. The axis of cylinder 12b is disposed in a horizontal plane located midway between cylinders 14b, 14c. The shafts 20 may have internal tubes 17 which open into the cylinders for passing steam or heated air into the cylinders to heat them, and for exhausting the spent steam or air.

A web W of any sheet material to be dried is passed up from a supply thereof to an axially horizontal idler roller 24 carried by rotating shaft 23. The web passes downwardly in an inclined path to the right as shown best in FIG. 1 and extends counterclockwise around cylinder 14c; then the web passes clockwise around cylinder 12b, counterclockwise around cylinder 14b, clockwise around cylinder 12a and counterclockwise around cylinder 14a; then downwardly obliquely to the left around idler roller 25 carried by shaft 27; then up to a web take-up station or to another set of cylinders (not shown). It will be noted that five prism-like spaces SP1–SP5 which are generally triangular in cross section are defined between adjacent courses of the web and adjacent sides of the cylinders. Space SP1 is open to narrow space SP1' between roller 25 and cylinder 12a. Space SP2 is open to space 2 between cylinder 14a, 14b. Space SP3 is open to space S1. Space SP4 is open to space S3 and space SP5 is open to space SP5' between cylinder 12b and roller 24.

Located in spaces SP1, SP3, SP5 are axially horizontal exhaust outlet tubes 30a, 30b, 30c respectively connected by flexible hoses 32 to a vertical conduit or standpipe 33. An additional exhaust outlet tube 30d is provided above the uppermost course W' of the web. This tube is also connected to standpipe 33. Vertical standpipe 34 spaced laterally of standpipe 33 carries axially horizontal exhaust tubes 35a, 35b connected by flexible hoses 37 and located in spaces SP2 and SP4. An additional exhaust tube 35c is connected to standpipe 34 and is located just below lowermost course w" of the web. The standpipes have closed upper ends 33', 34'. Opposite ends of the tubes can be joined to a vertical supporting plate 31: see FIGS. 2, 3, and 5. Plate 31 can be supported by base plate 31'. Screws 41' can be inserted through holes drilled in plate 31 and engaged in holes in ends 41 of the exhaust tubes. An alternative mounting arrangement, the ends of the exhaust tubes can be connected to the cylinder support structure (not shown).

The two standpipes terminate at a manifold 36 having a common outlet 38 connected by flexible hose 40 to an exhaust fan 42. The exhaust fan 42 has an outlet pipe 44 which terminates at a remote outside location where the contaminated air discharged cannot mingle with the fresh air intake of the apparatus. Each tube has a closed end 41 and two lines of longitudinally extending holes 43, 45 facing outwardly; see FIGS. 5, 6.

Figure 1:
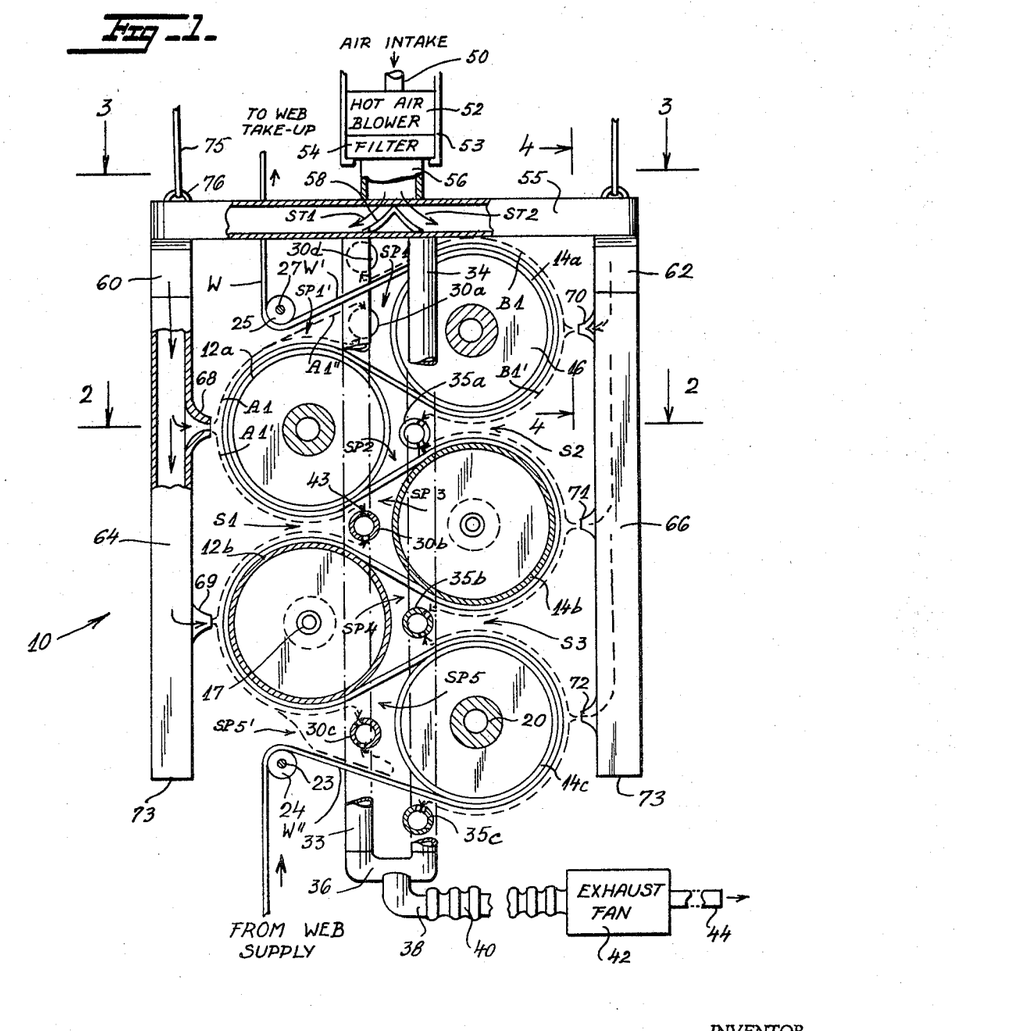
FIGURE 1 is a side view of a web drying apparatus embodying the invention, parts being broken away, and other parts being shown diagrammatically.
Figure 2:
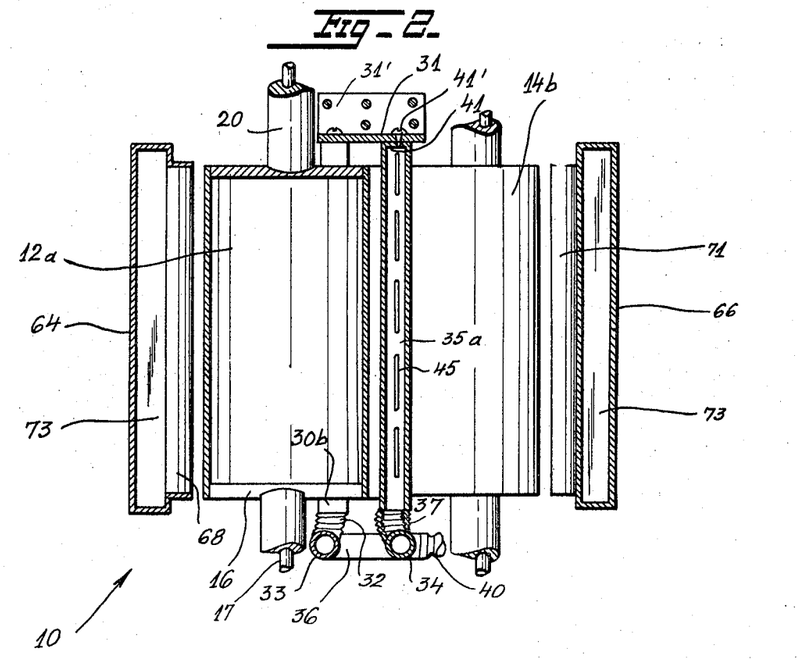
FIG. 2 and FIG. 3 are horizontal cross sectional views taken on lines 2—2 and 3—3 respectively of FIG. 1, with the web omitted.
Figure 3:
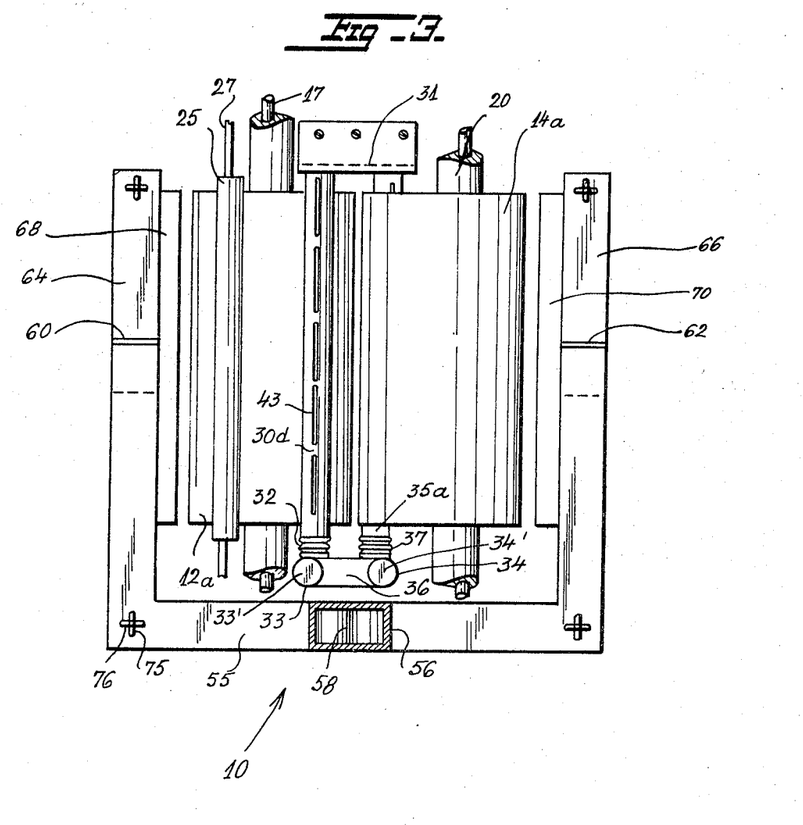
Figure 4:
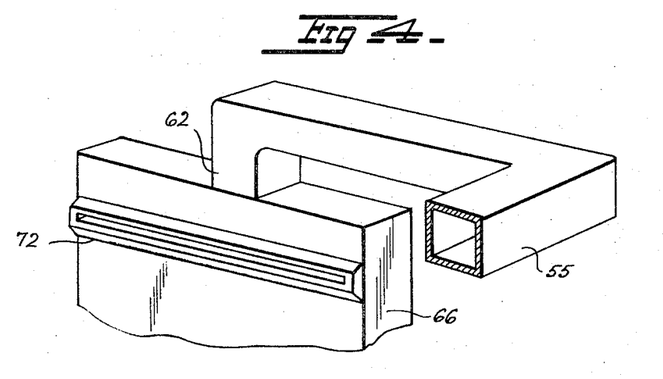
FIG. 4 is an enlarged perspective view of part of the apparatus taken on line 4—4 of FIG. 1.
Figures 5, 6:
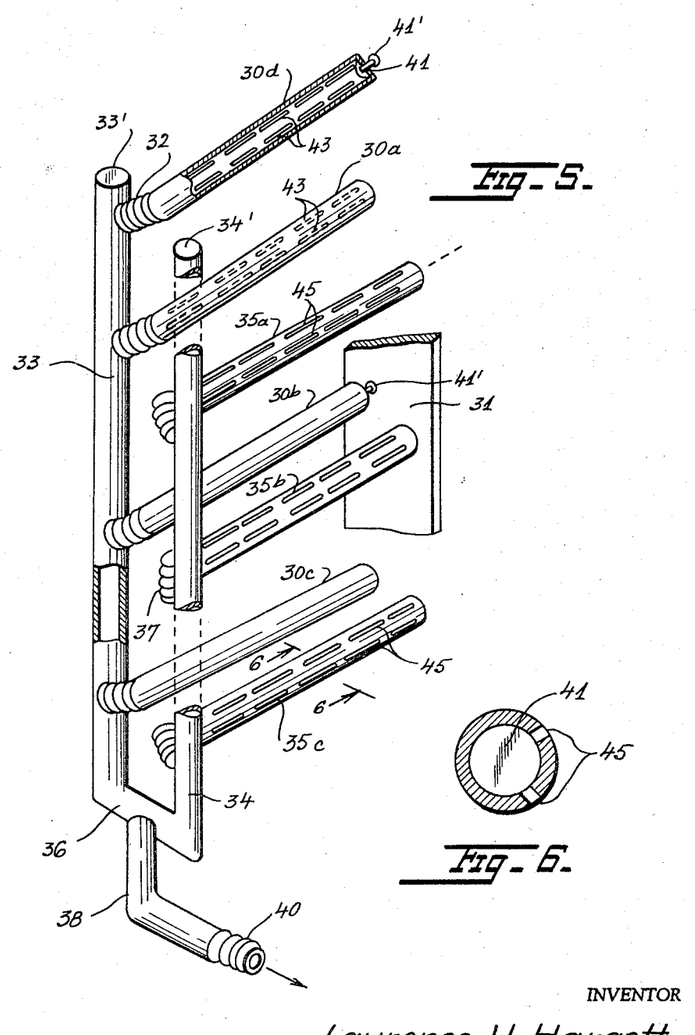
FIG. 5 is a perspective view with parts broken away of an exhaust tube assembly.
FIG. 6 is an enlarged cross sectional view taken on line 6—6 of FIG. 5.

The fresh air intake 50 is connected to a blower 52 shown supported by brackets 53 from an overhead mounting. In the blower the air is heated, passed through a filter 54 and fed to a horizontal distributing duct 55. At the throat 56 leading from the blower and filter to duct 55 is a tapered divider or baffle 58 which divides the air stream into two separate streams ST1, ST2 moving respectively left and right as shown in FIG. 1. Each end of duct 55 is double bent; see FIG. 4. Ends of the duct terminate in vertical sections 60, 62 connected to vertical rectangular ducts 64, 66. Duct 64 has two elongated horizontal tapered nozzles 68, 69. Duct 66 has three elongated horizontal tapered nozzles 70, 71, 72. Bottom ends 73 of ducts 64, 66 are closed. The ducts may be carried by overhead supports such as cables 75 connected to loops 76. By this arrangement the entire duct assembly can be elevated to clear the stack of cylinders so that the cylinders can be cleaned as often as necessary and so that the web can be threaded on the cylinders. The ducts can be arranged to move vertically up and down guided by rails, with a suitable system of counterweights to facilitate raising and lowering the ducts.

Arrows A1, A1' show the course of sheetlike air streams discharged by nozzle 68 and passing around cylinder 12a clockwise and counterclockwise respectively to enter elongated apertures or slots 43 in exhaust pipes 30a, 30b. A branch stream A1" passes along the underside of web course W" to pipe 30a.

Air discharged by nozzle 69 passes in two sheetlike streams indicated by arrows moving clockwise and counterclockwise respectively to enter apertures in exhaust pipes 30b, 30c. A branch stream indicated by an arrow enters pipe 30c after moving along the top of web course W"'. It will be noted that the nozzles 68, 69 discharge fresh, heated, filtered air only on one side of the web.

Nozzles 70–72 discharge air upon the other side of the web. This is a very important feature of the invention. Thus air from nozzle 70 passes in two sheetlike streams B1, B1' counterclockwise and clockwise respectively with respect to cylinder 14a and enters apertures in exhaust tubes 30d and 35a respectively. Air from nozzle 71 goes around cylinder 14b in two streams and is exhausted by tubes 35a and 35b. Air from nozzle 72 passes in streams counterclockwise and clockwise respectively with respect to cylinder 14c to enter apertures in tubes 35b, 35c. By this arrangement the heated air drying the web as it passes around the rotating heated cylinders, goes directly to the exhaust tubes without recirculating. Thus the contact heating effected by the heated cylinders is supplemented by the forced heated air convection supplied via the nozzles and exhausted by the exhaust tubes.

Figure 7:
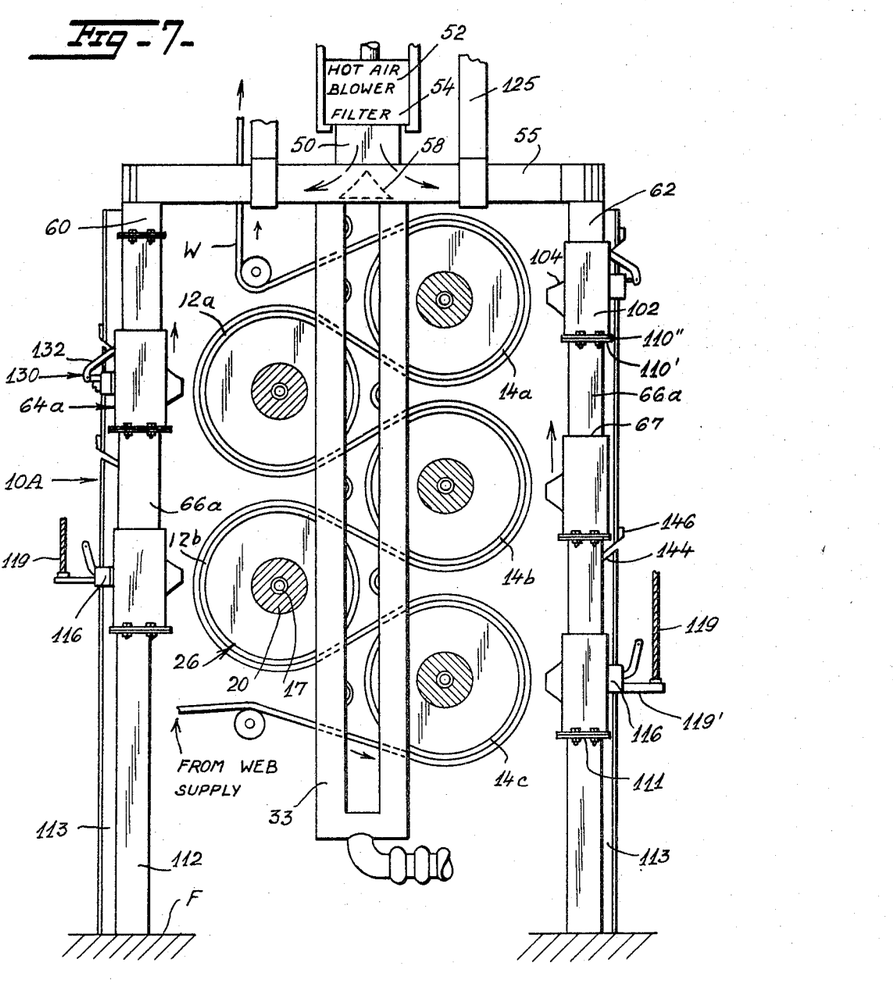
FIG. 7 is a side elevational view similar to FIG. 1, showing another web drying apparatus embodying the invention.
Figures 8, 9:
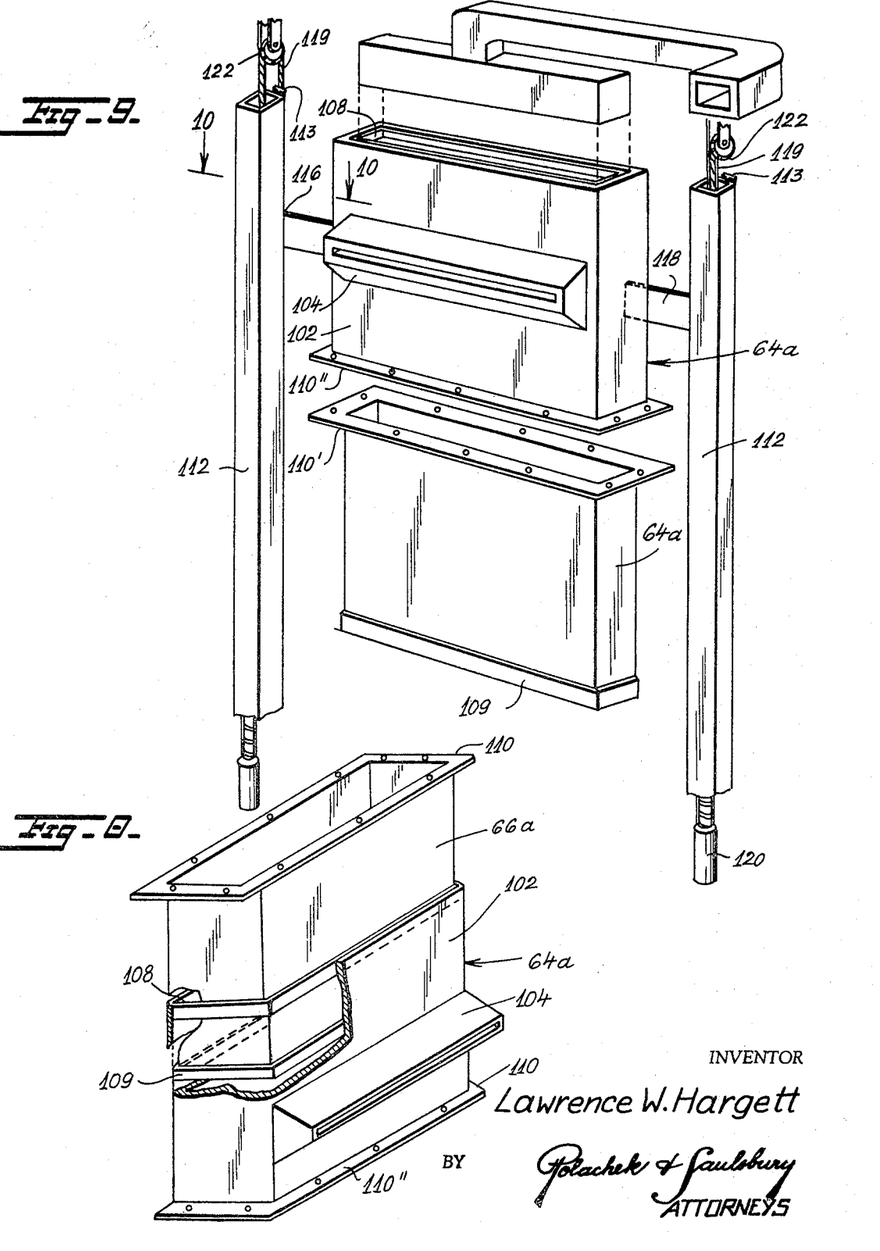
FIG. 8 is a perspective view of a nozzle unit and associated duct section, parts being broken away.
FIG. 9 is an exploded enlarged perspective view of parts of apparatus of FIG. 7.

In FIG. 7 is shown another web drying apparatus 10A which is generally similar to apparatus 10 and corresponding parts are identically numbered. In apparatus 10A the nozzles units 64a and connecting duct sections 66a are telescopically slidable. All the nozzle units and duct sections shown on both sides of cylinders 12a, 12b and 14a–14c are identical. Each nozzle unit 64a has a rectangular tubular body 102 in one side of which is formed horizontally extending nozzle 104. The nozzle units are axially vertical and are constructed so that the upper duct sections 66a may slide into the lower nozzle units 64a at their upper open ends 67, thereby enabling each assembly of nozzle units and duct sections to collapse to half its vertical height. Each lower duct section 66a and upper nozzle body 102 are bolted together at facing flanges 110', 110". The bottom nozzle units are closed by bolted plates 111. Band type flanges 108 are provided at upper ends of the side walls inside each nozzle body 102 as shown in FIG. 8. These flanges engage with flanges 109 secured outside of side walls of the upper duct section at lower ends of these walls. These flanges prevent the nozzle units from slipping off the upper duct sections when the assemblies are fully extended as shown in FIG. 7.

FIGS. 7, 9, and 10, and 13 show rectangular or square tubular rails 112 which stand up vertically from floor F, and braced at convenient points by supports (not shown) connected to the journal supports of the rotatable cans or cylinders. A carriage and track arrangement supports the telescopic nozzle and duct assembly. Each vertical rail 112 has a T-shaped track 113 attached to its rear side and running along its length. Wheels 114, 115 are rotatably mounted in channel shaped carriages 116 by shafts 117. Each nozzle body 102 is connected to two carriages by plates 118. The wheels 114, 115 rotate along opposite outer edges of the tracks 113. The lowest carriages 116 on each vertical assembly of nozzle units and duct sections facing one side of a stack of cylinders, have brackets 119' connected by chains 119 to counterweights 120. These counterweights slide up and down inside rails 112; see FIG. 10. The chains are entrained over idler sprockets 122 rotatably journaled above the rails. This arrangement enables the entire assembly of nozzle units and duct sections facing each side of the drying cylinders to collapse to half its height and to ride up and down easily on the tracks 113. Thus the nozzle units and duct sections can easily be moved out of the way to provide space for cleaning the cylinders.

Figures 10, 11, 12, 13:
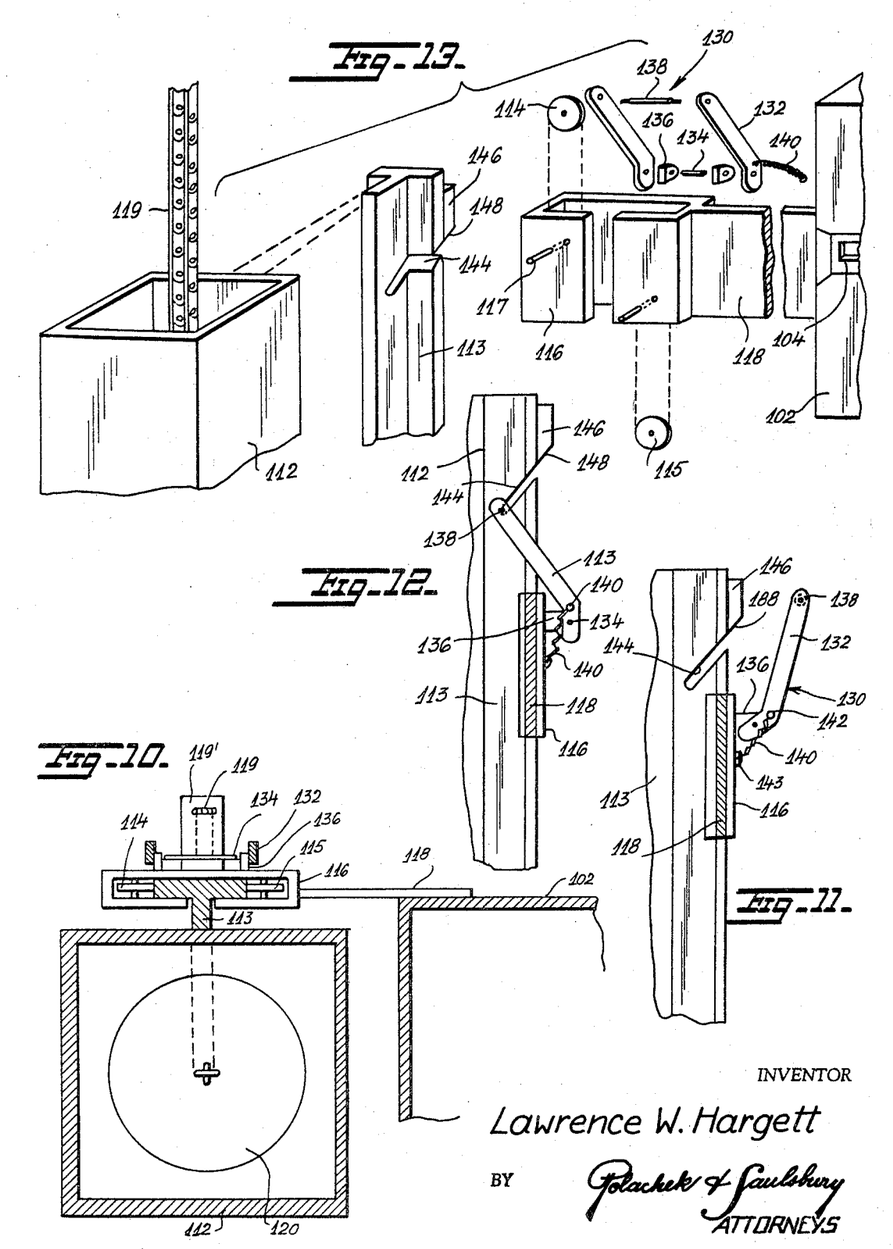
FIG. 10 is an enlarged sectional view taken on line 10—10 of FIG. 9.
FIG. 11 and FIG. 12 are enlarged views of parts of the apparatus of FIG. 7, showing details of a latching device, carriage and track.
FIG. 13 is an exploded enlarged perspective view of parts, the apparatus of FIG. 7.

In order to hold the vertical assemblies of nozzle units and duct sections in both extended and collapsed positions on tracks 113, there are provided latch devices 130 shown in FIGS. 7 and 10–13. One latch device is provided on each of the carriages of the uppermost and lowermost nozzle units. Each latch device comprises a pair of bent levers 132 pivotally mounted by a shaft 134 to bracket arms 136 secured to the rear or outer side of the carriage 116. A roller bar 138 extends horizontally between opposite outer ends of the levers 132. Springs 140 are secured between holes 142 on the levers and eyes 143 on the carriages. These springs are located so that the levers will be held by the spring in either the outwardly extending position away from tracks 113 as shown in FIG. 11 or in the inwardly extending position best shown in FIG. 12. The tracks are provided with inclined slots 144 in which the roller bars 138 can engage. Slots are provided near upper ends of the racks and at lower points. Just above the upper ends of the slots are blocks 146 with inclined bottom faces 148. When the nozzle units are disposed as shown in FIG. 7, the roller bars of the upper catch devices 130 are engaged in upper slots 144 of the tracks. Thus the nozzle units and their associated duct sections are suspended by the catch devices. When it is desired to raise an assembly of nozzle units and duct section assemblies, the lowermost nozzle unit will be raised. This will telescope into the adjacent upper duct section. The two duct sections can now be raised until the roller bars of the lower catch devices are opposite the upper open ends of the lower slots 144. The levers 132 can now be pushed in manually and the roller bars will engage in the lower slots. Now the collapsed assembly of nozzle units and duct sections can be lowered slightly to seat the roller bars securely in the slots 144. By this arrangement the lower cylinders can be exposed for cleaning or threading a new web thereon.

When access is desired to the upper cylinders, the assembly of nozzle units and duct sections will be raised to collapse it as before, but instead of engaging the lower roller bars in lower slots 144, the assembly will be raised further so that the upper roller bars will be disengaged from the upper slots 144. The blocks 146 with their inclined bottom faces serve to rotate the roller bars and lever arms outwardly until the springs 140 are turned past the pivot points of the levers, whereupon the levers snap outwardly fully. Then the springs hold the levers and roller bars turned outwardly as shown in FIG. 11. The entire assembly of nozzle units and duct sections can now be lowered to the floor to expose the upper cylinders for cleaning or for threading of the web thereon.

The apparatus 10 and 10A described thus provide relatively simple improved means for drying webs on both sides more quickly, efficiently and satisfactorily.

While I have illustrated and described the preferred embodiments of my invention, it is to be understood that I do not limit myself to the precise construction herein disclosed and that various changes and modifications may be made within the scope of the invention as defined in the appended claims.

What is claimed is:

1. In combination, drying apparatus, a plurality of rotatable vertically spaced heated cylinders disposed in two axially horizontal laterally spaced vertical arrays, with the axis of each cylinder in one vertical array being disposed in a horizontal plane midway between two other vertically spaced cylinders in the other array of cylinders, a web of sheet material entrained on said cylinders, said apparatus comprising two laterally spaced vertical ducts, each of the ducts having elongated horizontally disposed nozzles located adjacent to one of the cylinders in its horizontal diametral plane, hot air distributing means connected to the vertical ducts so that hot air discharged from the nozzles impinges on opposite sides of the web as it travels around the rotating cylinders, two stacks of air exhaust tubes, each of said stacks comprising a vertical standpipe, a plurality of axially horizontal longitudinal apertured exhaust tubes carried by the standpipes and spaced so that they can be located adjacent the cylinders to draw moistened heated air off opposite sides of the web as the hot air passes from the ducts and partially around the cylinders directly to the exhaust tubes, and suction means connected to the standpipes for drawing air through the exhaust tubes.

2. The combination as recited in claim 1, further comprising flexible hoses connecting the tubes to the exhaust pipes so that the stand pipes and exhaust pipes can be adjustably positioned adjacent the cylinders.

3. In combination, drying apparatus a plurality of rotatable vertically-spaced heated cylinders disposed in two axially horizontal laterally spaced vertical arrays, with the axis of each cylinder in one vertical array being disposed in a horizontal plane midway between two other vertically-spaced cylinders in the other array of cylinders, a web of sheet material entrained on said cylinders, said apparatus comprising two laterally spaced vertical ducts, each of the ducts having elongated horizontally disposed nozzles located adjacent to one of the cylinders in its horizontal diametral plane, hot air distributing means connected to the vertical ducts so that hot air discharged from the nozzles impinges on opposite sides of the web as it travels around the rotating cylinders, each of the vertical ducts comprising a plurality of nozzle units and a plurality of duct sections, said nozzle units comprising a rectangular axially vertical tubular body with one of said nozzles formed in one side of said body, each of said duct sections comprising a rectangular tubular other body slidably interfitted at one end with the tubular body of the nozzle unit, so that the vertical ducts can be axially collapsed to expose the cylinders for cleaning and for placing the web on the cylinders.

4. The combination as recited in claim 3, further comprising two stacks of air exhaust tubes, each of said stacks comprising a vertical standpipe, a plurality of axially horizontal longitudinal apertured exhaust tubes carried by the standpipes and spaced so that they can be located adjacent the cylinders to draw moistened heated air off opposite sides of the web as the hot air passes from the ducts and partially around the cylinders directly to the exhaust tubes and suction means connected to the standpipes for drawing air through the exhaust tubes.

5. The combination as recited in claim 4, wherein said hot air distributing means is another duct connected to ends of the vertical ducts, a hot air blower operatively connected to said other duct to supply hot air thereto, and a divider member in the other duct for dividing the hot air therein into two streams passing to the two vertical ducts respectively.

6. The combination as recited in claim 1, wherein each of the vertical ducts comprises a plurality of nozzle units and a plurality of duct sections, said nozzle units comprising a rectangular axially vertical tubular body with one of said nozzles formed in one side of said body, each of said duct sections comprising a rectangular tubular other body slidably interfitted at one end with the tubular body of the nozzle unit, so that the vertical ducts can be axially collapsed to expose the cylinders for cleaning and for placing the web on the cylinders.

7. The combination as recited in claim 3, further comprising a plurality of vertical stationary tracks, carriage members connected to all of the nozzle units and slidably disposed on the tracks for guiding the nozzle units and duct sections when the ducts are collapsed.

8. The combination as recited in claim 7, further comprising stationary vertical tubular rails supporting said stationary tracks, counterweights slidably disposed in said rails, sprockets rotatably supported above the rails, and chains connecting the counterweights with the lowermost nozzle units and entrained on the sprockets, to facilitate elevating and lowering the nozzle units and duct sections when the vertical ducts are being contracted and expanded.

9. Drying apparatus as recited in claim 7, further comprising latch devices carried by the uppermost and lowermost carriage members, said tracks having slots for detachably engaging the latch devices, whereby the ducts are supported on the tracks in both expanded and contracted positions by said latch devices.

References Cited

UNITED STATES PATENTS

| | | | |
|---|---|---|---|
| 1,298,655 | 4/1919 | Briner | 34—114 |
| 2,330,395 | 9/1943 | Sullivan | 34—114 |
| 2,570,318 | 10/1951 | Butterworth et al. | 34—115 |
| 3,052,991 | 9/1962 | Goldner | 34—114 XR |

KENNETH W. SPRAGUE, *Primary Examiner.*